United States Patent [19]

Lewis

[11] 4,197,543
[45] Apr. 8, 1980

[54] DISPLAY PROCESSOR FOR AIRCRAFT LANDING SYSTEM

[75] Inventor: Bernard L. Lewis, Oxon Hill, Md.

[73] Assignee: The United States of America as represented by the Secretary of the Navy, Washington, D.C.

[21] Appl. No.: 11,834

[22] Filed: Feb. 13, 1979

[51] Int. Cl.$^2$ .............................................. G01S 3/02
[52] U.S. Cl. ........................... 343/112 R; 343/108 R; 340/26
[58] Field of Search ........... 343/112 R, 108 R, 113 R, 343/5 LS; 340/26

[56] References Cited
U.S. PATENT DOCUMENTS 3,237,195  2/1966  Schiffman ........................ 343/112 R Primary Examiner—Theodore M. Blum
Attorney, Agent, or Firm—R. S. Sciascia; Philip Schneider

[57] ABSTRACT

A circuit for processing the azimuth error video signal of a monopulse receiver in an aircraft to separately but simultaneously display the heading and position of the craft. The azimuth error signal is simultaneously applied to a sample-and-hold (SAH) circuit, a delay means and a one-shot multivibrator (MV). The MV opens the SAH to accept the first ground-transmitter signal in a sequence, the SAH charging a capacitance to the magnitude of the signal, and then prevents the SAH from accepting any further signals in the sequence. The output of the SAH is subtracted from the delayed signal to obtain a video signal indicative of aircraft position, and the output of the first subtracter is subtracted from the delayed signal to obtain a video signal indicative of the aircraft heading.

8 Claims, 5 Drawing Figures

DISPLAY PROCESSOR FOR AIRCRAFT LANDING SYSTEM

BACKGROUND OF THE INVENTION

The invention involves an aircraft landing system which will operate under zero visibility conditions. More specifically, the aircraft landing system provides the pilot a perspective view of a runway on which he intends to land.

DESCRIPTION OF THE PRIOR ART

It is essential that a pilot have an accurate aircraft landing system for use under conditions of zero visibility. Several types of systems are presently employed or proposed. One type of system uses an expensive surveillance radar to obtain a perspective view of the runway. This system requires a relatively large antenna to obtain the required azimuth resolution and a surveillance radar with a powerful short pulse transmitter, receiver and special display modes. Another type system uses radars and computers to guide the pilot in via radio links. An example is a Microwave Landing System (MLS). The MLS system is very expensive and complicated and cannot land an aircraft in zero-zero visibility conditions in the presence of winds across the runway. A third type of system involves the display of information derived from Visual-Omni-Range (VOR) receivers, gyros, and other equipment of this type. This last type of system is not as accurate as desired.

A fourth type of system is proposed in U.S. Pat. No. 3,237,195 to J. Schiffman. This system uses microwave beacons arranged on both sides of a runway which are triggered to insure that no two beacons transmit simultaneously. To receive these signals the aircraft uses a 3-channel hybrid, phase amplitudecomparison monopulse radar which includes a pattern of 4 antennas with different phase centers and different boresight axes with two in the vertical plane and two in the horizontal plane. The sum of the signals from the four antennas unblanks a CRT beam when beacon signals arrive. The monopulse radar uses the difference of the signals received by the horizontally oriented antennas to determine the azimuth angle between the beacon and the average boresight axis of the pair of antennas. A voltage proportional to the azimuth angle is used to control the azimuth (x axis) of a CRT display. The vertically oriented antennas in a similiar manner determine the elevation angle of the beacons from the average boresight axis of the two antennas. A voltage proportional to the elevation angle is fed to the Y axis of the CRT. The use of the azimuth information of the X axis, the elevation information on the Y axis, and the sum signal on the Z (intensity) axis provides a perspective view of the runway much the same as a pilot would view with his eyes.

The problem with this system lies in the use of elevation angle information on the Y axis to establish a perspective view. One deficiency is that for each ground beacon there is a transmitted signal and a multipath transmitted signal (reflected off the ground) which are both received by the monopulse receiver. The multipath signal causes an error in the elevation angle determination and hence distorts the display presentation. In addition, as the aircraft gets closer to or over the runway, and all of the elevation angles of the beacons begin to get very large the perspective view begins to move down on the display.

U.S. Pat. No. 4,101,893, which is incorporated herein by reference, overcomes many of the problems of the prior art by providing a perspective display of a runway, in which display the Y-axis is not determined by elevation angle but by the distance (range) over which a group of microwave transmitters extend along the edges of the runway. This type of display, however, tends to be somewhat confusing since it presents both position and heading information in the same image and it may be necessary for the pilot to use up a little time in interpreting the image when very little time is available.

SUMMARY OF THE INVENTION

An object of this invention is to separately but simultaneously display heading and position of an aircraft in relation to the runway as the aircraft is coming in for a landing.

This and other objects and advantages are accomplished by a signal-processing circuit which takes the azimuth error video signal (AES) output of monopulse receiver on the aircraft as a starting point. The AES is a sequence of microwave pulses, each of which is radiated from a different transmitter on the edges of the landing runway. The first pulse, which is radiated from the farther end of the runway, is taken as a reference signal. This reference signal is subtracted from each succeeding AES to provide signals from which the heading angle of the craft has been removed—this provides an indication of the position of the craft with respect to the position of the runway when all signals in the sequence are displayed.

Each position signal is also substracted from its associated incoming AES to provide a signal indicative of the heading when all signals in the sequence are displayed.

DETAILED DESCRIPTION

Figure 1:
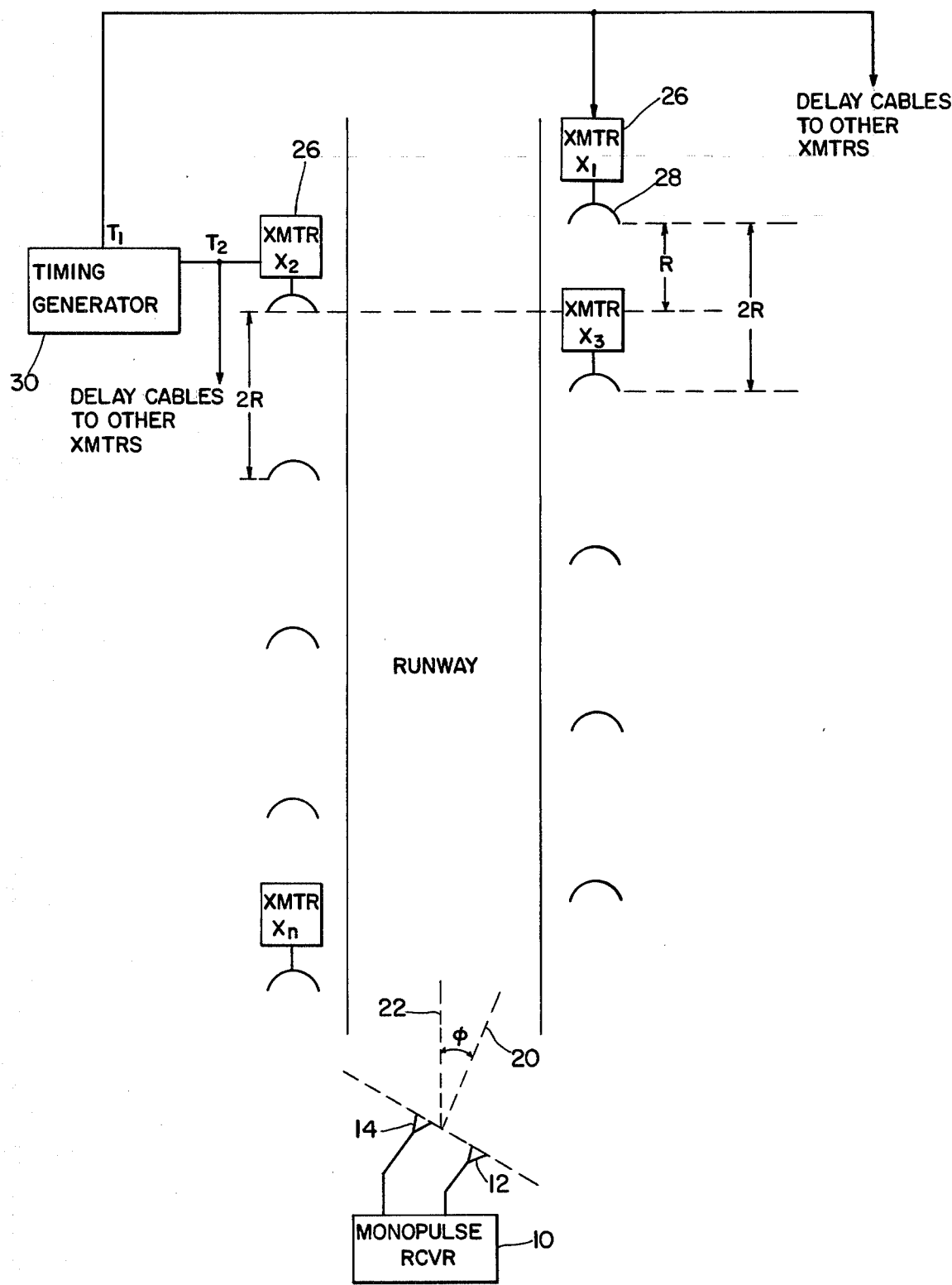
FIG. 1 is a schematic illustration of the runway and ground equipment employed in conjunction with the present invention.

FIG. 1 shows a runway and the ground equipment which is associated with the use of the present invention. A set of n microwave transmitters 26 and their associated antennas 28 are set up along the right and left edges of the runway. Each antenna 28 on either side is spaced a distance of 2 R from its nearest neighbor; thus, the distance between the antenna's for transmitters $X_1$ and $X_3$ is 2 R. The distance along the runway axis between an antenna on one side and next nearest antenna on the other side, e.g., the antennas $X_1$ and $X_2$, is R, that is, the antennas on one side are offset from each other not only laterally but also in the axial direction. A timing generator produces timing pulses $t_1$ to $t_n$ which are coupled to transmitters to initiate transmission of a burst of microwaves from each transmitter in the sequence $T_1, T_1+t_1, T_1+2_t$—$T_1+(n-1)t$, $T_1$ being the starting time of the pulse to $X_1$, $T_1+t$ being the starting time of the pulse to $X_3$, and so on, where t is the time period between the start of one pulse to the start of the next succeeding pulse. As may be seen, all transmitters on the right side of the runway are fired in one sequence and then all transmitters, $X_2$, $X_4$—$X_n$, on the other side of the runway are fired in sequence.

Figure 2:
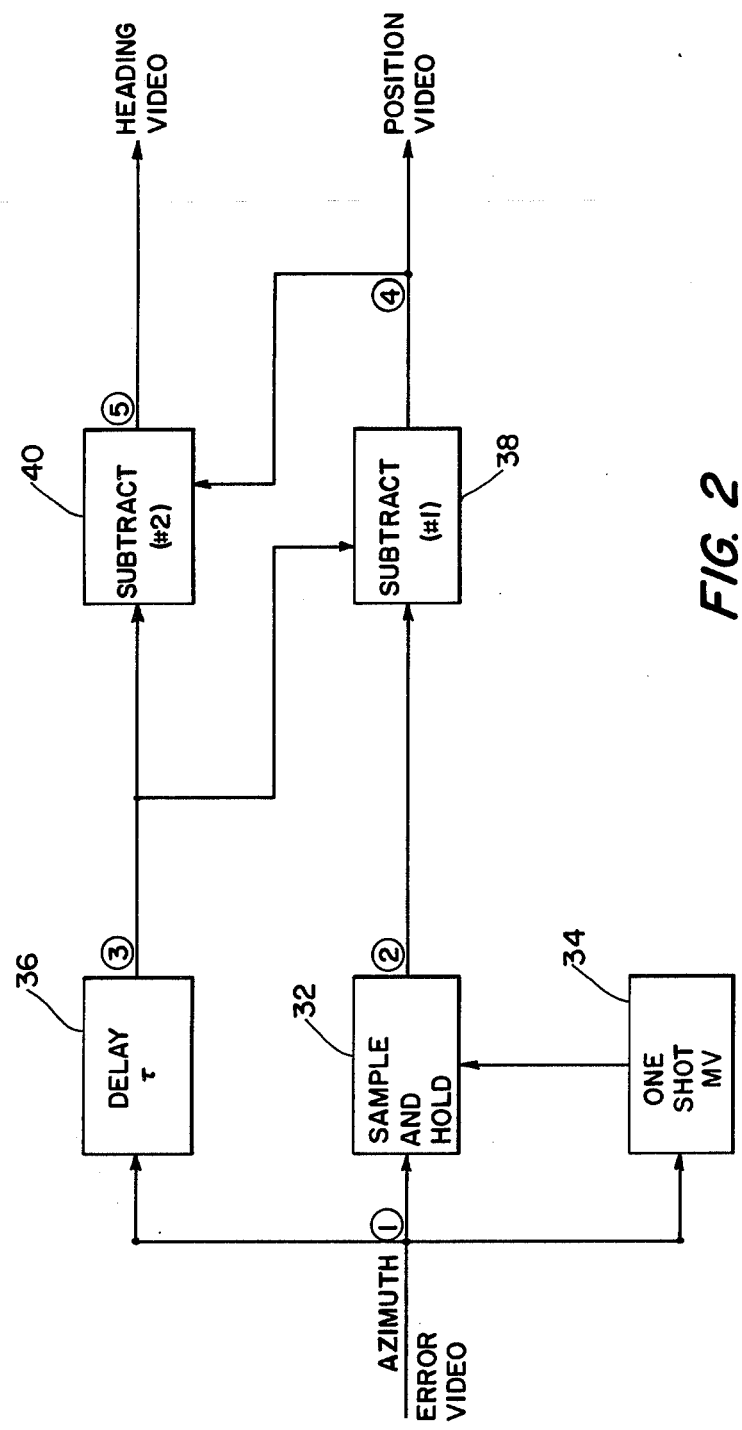
FIG. 2 is an embodiment of the circuit of the invention in block form.

FIG. 2 illustrates in block form a preferred embodiment of the present invention. The circuit shown obtains its input signal from the video amplifier 24 of the monopulse receiver 10 shown in FIG. 1 of U.S. Pat. No. 4,101,893 which is incorporated by reference herein. The input signal is called the "azimuth angle video" in that figure. The angle between the boresight 20 of the antennas 12 and 14 on the aircraft and a line 22 parallel to the longitudinal axis through the center of the runway is the crab angle, $\phi$, of the craft. The signal received from transmitter $X_1$ by antenna 12 may be called A and that received by antenna 14 may be called B. Since the aircraft in FIG. 1 of the present application is shown in a crab-right orientation, signal A is received before signal B and thus leads signal B in phase angle. The mathematical expressions for signals A and B may be written as:

$$A = |A| \cos(wt+\theta)$$

$$B = |B| \cos(wt-\theta)$$

where $2\theta$ is the phase angle between the signals. These signals are processed through the monopulse receiver on the aircraft and an azimuth angle video signal is obtained as the output signal from the video amplifier 24. This azimuth error signal is applied to a sample-and-hold circuit (SAH) 32 and to a one-shot multivibrator (MV) 34 which provides a pulse to the (SAH) circuit 32 to start its operation, contain means to permit the charging of a capacitance to the amplitude of the azimuth error signal and to maintain the value of the charge through the time required for the transmitters on one side of the runway to go through a single sequence of transmissions.

The azimuth error signal from transmitter $X_1$ is applied to the 1-shot MV32 which generates a pulse which permits the (SAH) circuit to charge its capacitance to the amplitude of the $X_1$ signal. The one-shot MV then goes into a non-operative condition and is kept in this off-state until the period after the last transmission from the right side of the runway and the first transmission from transmitter $X_2$ on the left side of the runway. Then, the one-shot MV becomes set to receive the burst of oscillation from transmitter $X_2$ and to produce a pulse which opens the (SAH) circuit again, the (SAH) circuit capacitance having been discharged in the 40-$\mu$sec time period after the transmission from the last transmitter on the right side of the of the runway. This first signal ($X_2$) then becomes the reference signal for the transmissions from the left side of the runway.

Coming back to the transmissions from the right-side transmitters, the signal from $X_1$ is sampled and also applied to a delay circuit 36 where it is delayed by a certain time, $\tau$, greater than the time required for the sampling operation (about 100 nanoseconds). This allows the DC level of the $X_1$ signal to be established but is insignificant relative to other times involved. The output signal from the (SAH) circuit is subtracted from the output signal from the delay circuit (i.e., ③ − ②) in a subtracter #1(38) to provide the position video signal ④ and this difference signal ④ is subtracted in subtracter #2 (40) from delay circuit signal ③ to provide the heading video signal ⑤.

The heading video signal ⑤ and the position video signal ④ are applied to the X-axis inputs of separate display oscilloscopes, preferably, although they can be displayed on separate portions of the same scope, if desired, by properly biasing the X-axis input.

Generalized mathematical expressions for the signals are:

$$① (A_i + B_i)[j(A_i - B_i)] = |A_i + B_i| |A_i - B_i| \cos \alpha_i$$

where i is an integer from 1 to n, j is the imaginary operator, and $\alpha$ is either 0° or 180°, depending upon whether the signal is coming from the right or the left of the boresight of the two antennas used with the monopulse receiver, the value of cos 0° being 1, and the value of cos 180° being −1.

$$② (A_1 + B_1)[j(A_1 - B_1)] = |A_1 + B_1| |A_1 - B_1| \cos \alpha_1 = K \cos \alpha_1$$

where K is a numerical magnitude

③ $(A_i + B_i)[j(A_i - B_i)]$ delayed by $\tau$.

④ = ③ − ②

⑤ = ③ − ④ = ③ − ③ + ② = ②

Note that signal ② has a specific value $K_1$ for the transmission from the right side of the runway and $K_2$ for the transmissions from the left side of the runway.

Signal ④ contains both magnitude and angle information and changes for each transmission.

Signal ⑤ is merely signal ②, being one value for the right-side sequence and another value for the left-side sequence.

The heading video is applied to the X-axis and the Z (intensity) inputs of one scope and the position video to the X-axis and Z inputs of another scope. The Y-axis input is a single sweep of sufficient duration to outlast a sequence of transmissions from one side of the runway. The Y-sweep is triggered by the transmission from the first transmitter on that side, e.g, $X_1$ on the right side, and is restarted by the transmission from $X_2$ for the left-side transmissions.

Figure 3:
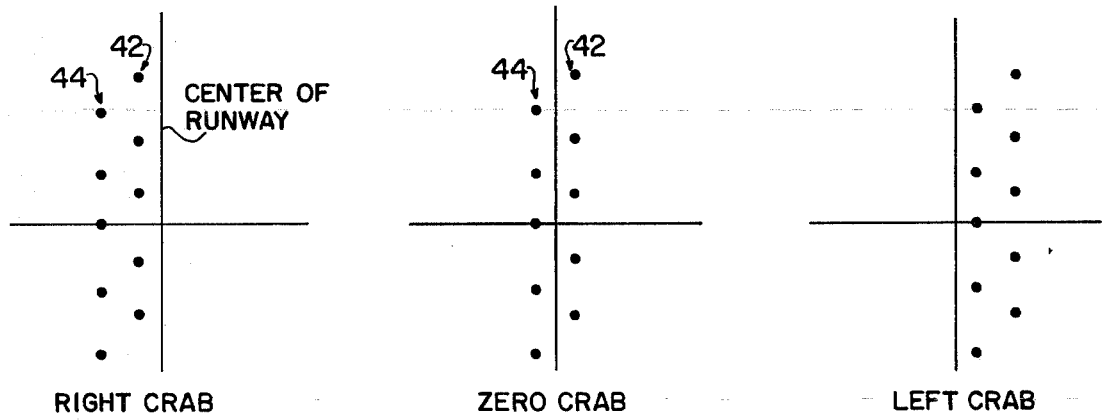
FIG. 3 is an illustration of three examples of heading displays which can be obtained with the present invention.

FIG. 3 shows heading displays for the conditions of right crab, zero crab and left crab with the aircraft coming in along the middle of the runway. Note that the heading and position displays show the runway and transmitters as they would appear to the pilot were he to look out of his window at them. Each vertical line of dots on a display is written in sequence, column 42 first, then column 44, then column 42, and so on. The scope is biased so that negative input signals appear on the left side of the center and positive input signals on the right. The monopulse receiver provides the sum and difference of the signals A and B received from each transmitter. The phase angle between the sum and difference resultants is always plus or minus 90° and, by shifting the difference resultant by 90°, the final phase difference between the sum and difference resultants is either 0° or 180°. This means, physically, that azimuth error signals from transmitters on the left side of the boresight of the monopulse receiver antennas have a negative polarity and those on the right side a positive polarity, giving the images shown in FIG. 3 for different aircraft crab orientations.

Figure 4:
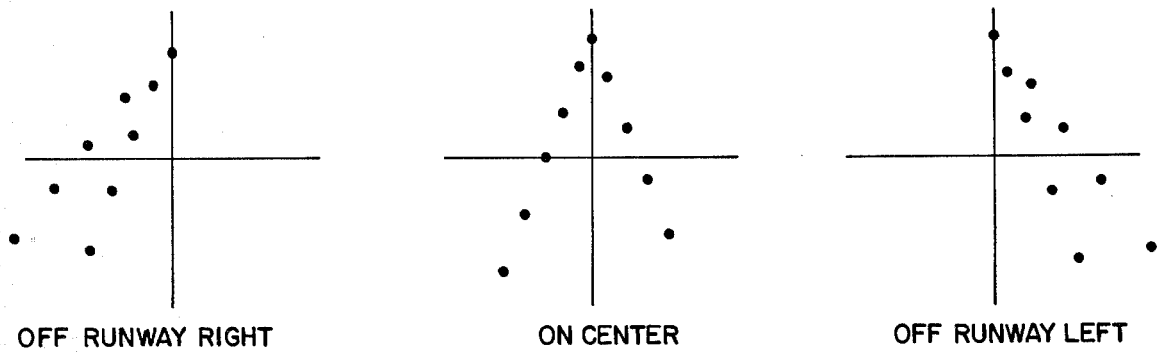
FIG. 4 is an illustration of three examples of position displays which can be obtained with the present invention.

FIG. 4 shows the position displays provided by the invention when the aircraft is heading parallel to the runway without any yaw, or crab. If the craft is off the runway to the right, the signals are coming from the left of the boresight and are negative; if off the runway to the left, the signals are coming from the right of the boresight and are positive. The reason the first signal lies on the center line of the scope is because the position signal input to the scope is equation (4) = (3) − (2). But for the first signal in each sequence, (3) = (2) except for the slight delay, $\tau$, and therefore all angle data is removed.

Variations of the invention can be effected. For example, the first transmitter can be placed in the middle of the runway at the far end and the sequence can thereafter be the next nearer right-side transmitter, the next nearer left-side transmitter, and so on. This has some advantage in that the center line between the columns of transmitters is always located by a dot. Also, the spacings of the transmitters do not have to be equal, but the left-side and right-side transmitters must not have the same range, range being defined herein as distance from a point at the touchdown end of the runway along the center line.

Figure 5:
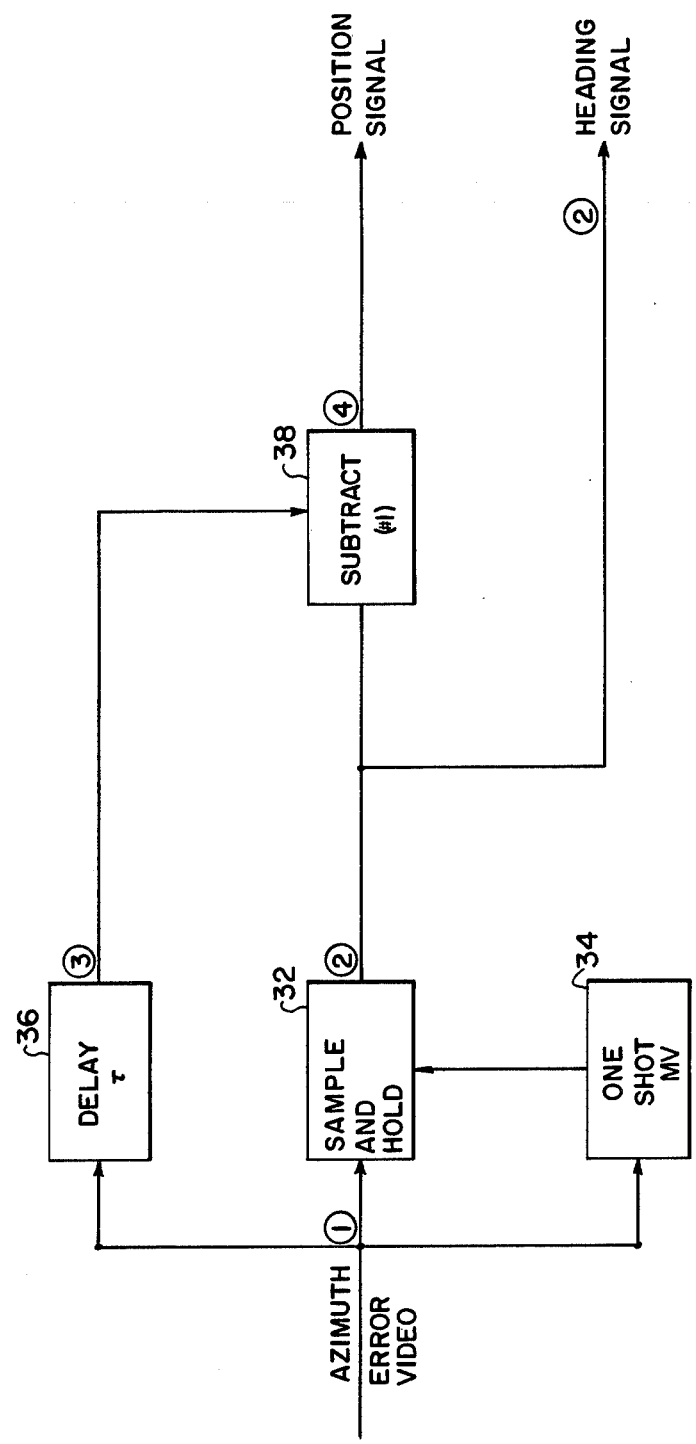
FIG. 5 is an embodiment of a preferred form of the invention in block form.

For purposes of explanation, the invention has been shown in connection with an embodiment (FIG. 2) which is symmetrical in that the heading signal is obtained by subtracting out the components of position and the position signal is obtained by subtracting out the components of heading. However, it will be noted that signal (5) is the same as signal (2) so that subtracter #2(40) is really unnecessary. Thus, a preferred embodiment of the invention is shown in FIG. 5.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In an aircraft landing system utilizing a monopulse receiver and at least one display oscilloscope in an aircraft and a plurality of ground-based pulse transmitters arranged along either side of runway, all transmitters on left side being displaced in range from those on the right side, the sequence of firing of the transmitters being in order from the far end of the runway to the touchdown end, the sweep voltage on the oscilloscope being a single sweep per sequence of firings and the sweep being triggered by the first received pulse in any sequence, a signal-processing circuit comprising:
    a sample-and-hold (SAH) circuit to which the azimuth error video signal of the monopulse receiver is fed as an input, the output of the SAH circuit being a constant dc signal;
    means, receiving the same input signal as the SAH circuit, for generating a signal which is fed to the SAH circuit to open it to receive the first input signal in a sequence and to prevent it from receiving any other signal in that sequence;
    delay means to which said azimuth error video signal is fed as an input, for delaying its input signal by a small amount;
    a first subtracter circuit for subtracting the output signal of the SAH circuit from the output signal of the delay means to provide a position video signal to apply to a display oscilloscope; and
    a second subtractor circuit for subtracting the output of the first subtracter circuit from that of the delay means to provide a heading video signal to apply to a display oscilloscope,
    whereby the heading and position of the aircraft may be separately but simultaneously displayed to the pilot of the aircraft.

2. A circuit as in claim 1, wherein:
    said SAH circuit charges a capacitor to the magnitude of its input signal and maintains the charge at approximately the same value for a period covering the time duration of a sequence of pulses from the ground transmitters.

3. A circuit as in claim 1, wherein:
    said means for generating a signal to open said SAH to receive its input signal is a one-shot multivibrator.

4. In an aircraft landing system utilizing a monopulse receiver and at least one display oscilloscope in an aircraft and a plurality of ground-based pulse transmitters arranged along either side of a runway, all transmitters on left side being displaced in range from those on the right side, the sequence of firing of the transmitters being in order from the far end of the runway to the touchdown end, the sweep voltage on the oscilloscope being a single sweep per sequence of firings and the sweep being triggered by the first received pulse in any sequence, a signal-processing circuit comprising:
    first means for processing the azimuth error signal (AES) from the monopulse receiver, the AES being of the type $$|(A_i+B_i)|\,|j(A_i-B_i)|\,\cos\alpha_i \tag{1}$$

where A is the output signal from one of the antennas of the monopulse receiver and B the output signal from the other, i is an integer from 1 to n corresponding to a particular transmitter on the ground, j is the imaginary operator, and $\alpha$ is either 0° or 180° depending on whether the particular signal is being received from a transmitter to the right or the left of the boresight of the antennas, said processing means providing an output signal K which is the magnitude of signal (1) when signal (1) is the first signal in a sequence;
    second means for permitting said processing means to receive only the first signal in a firing signal;
    third means for delaying signal (1) for a small time;
    fourth means for subtracting signal K from delayed signal (1) to obtain signal (4) of form $|(A_i+B_i)|\,|j(A_i-B_i)|\,\cos\alpha_i - K$ which is a signal indicative of the position of the aircraft; and
    5th means for subtracting signal (4) from the delayed signal (1) to obtain a signal of value K which is indicative of the heading of the craft.

5. A circuit as in claim 1, wherein said first means includes capacitive means which is charged to said value K and which holds this value until the sequence with which it is associated is over.

6. In an aircraft landing system utilizing a monopulse receiver and at least one display oscilloscope in an aircraft and plurality of ground-based pulse transmitters arranged along either side of runway, all transmitters on left side being displaced in range from those on the right side, the sequence of firing of the transmitters being in order from the far end of the runway to the touchdown end, the sweep voltage on the oscilloscope being a single sweep per sequence of firings and the sweep being triggered by the first received pulse in any sequence, a signal-processing circuit comprising:

first means for processing the azimuth error signal (AES) from the monopulse receiver, the AES being of the type $$|(A_i+B_i)||j(A_i-B_i)|\cos\alpha_i \qquad (1)$$

where A is the output signal from one of the antennas of the monopulse receiver and B the output signal from the other, i is an integer from ① to n corresponding to a particular transmitter on the ground, j is the imaginary operator, and $\alpha$ is either 0° or 180° depending on whether the particular signal is being received from a transmitter to the right or the left of the boresight of the antenna, said processing means providing an output signal K which is the magnitude of signal ① when signal ① is the first signal in a sequence, said first means including a capacitive means which is charged to said value K and which holds this value until the sequence with which it is associated is over;

second means for permitting said processing means to receive only the first signal in a firing sequence third means for delaying signal ① for a small time;

fourth means for subtracting signal K from delayed signal ① to obtain signal ④ of form $|(A_i+B_i)||j(A_i-B_i)|\cos\alpha_i - K$ which is a signal indicative of the position of the aircraft; and the output signal K from said first means being the signal applied to said oscilloscope as the aircraft heading signal.

7. In an aircraft landing system utilizing a monopulse receiver and at least one display oscilloscope in an aircraft and a plurality of ground-based pulse transmitters arranged along either side of runway, all transmitters on left side being displaced in range from those on the right side, the sequence of firing of the transmitters being in order from the far end of the runway to the touchdown end, the sweep voltage on the oscilloscope being a single sweep per sequence of firings and the sweep being triggered by the first received pulse in any sequence, a signal-processing circuit comprising:

a sample-and-hold (SAH) circuit to which the azimuth error video signal of the monopulse receiver is fed as an input, the output of the SAH circuit being a constant dc signal;

means, receiving the same input signal as the SAH circuit, for generating a signal which is fed to the SAH circuit to open it to receive the first input signal in a sequence and to prevent it from receiving any other signal in that sequence;

delay means to which said azimuth error video signal is fed as an input, for delaying its input signal by a small amount;

a first subtracter circuit for subtracting the output signal of the SAH circuit from the output signal of the delay means to provide a position video signal to apply to a display oscilloscope, the output signal of said SAH circuit being applied to said oscilloscope as the aircraft heading signal.

8. A circuit as in claim 7, wherein:

said SAH circuit includes capacitive means which is charged to the value of said constant dc signal and which holds this value until the sequence with which it is associated is over.

* * * * *